United States Patent [19]

Shio

[11] Patent Number: 5,872,586
[45] Date of Patent: Feb. 16, 1999

[54] APPARATUS FOR REGISTRATION OF PLURAL IMAGE IN AN IMAGE FORMING APPARATUS

[75] Inventor: Yutaka Shio, Tottori, Japan

[73] Assignee: Ricoh Company, Ltd., Tokyo, Japan

[21] Appl. No.: 784,923

[22] Filed: Jan. 16, 1997

[30] Foreign Application Priority Data

Jan. 17, 1996 [JP] Japan ................................. 8-024784
Apr. 19, 1996 [JP] Japan ................................. 8-122764

[51] Int. Cl.$^6$ ................................. G03G 15/01
[52] U.S. Cl. ................................. 347/116; 399/301
[58] Field of Search ................................. 399/301; 358/526; 347/116, 248, 249

[56] References Cited

U.S. PATENT DOCUMENTS 4,903,067  2/1990  Murayama et al. ................. 347/129
5,444,525  8/1995  Takahashi et al. ................. 399/76

Primary Examiner—Joan Pendegrass
Attorney, Agent, or Firm—Oblon, Spivak, McClelland, Maier & Neustadt, P.C.

[57] ABSTRACT

In an image forming apparatus, a plurality of image forming means devices are sequentially arranged along a conveyor belt and sequentially form register marks on the conveyor belt. A sensor senses the register mark formed by the individual image forming device. A correcting section corrects, based on the output of the sensor, the register position of the individual image forming device with respect to a regular deviation component and an irregular deviation component fluctuating at a particular period. The apparatus is capable of producing high quality color images suffering from a minimum of color misregister.

10 Claims, 16 Drawing Sheets

APPARATUS FOR REGISTRATION OF PLURAL IMAGE IN AN IMAGE FORMING APPARATUS

BACKGROUND OF THE INVENTION

The present invention relates to a color copier, color printer, color facsimile apparatus or similar color image forming apparatus.

The problem with a color image forming apparatus is that any deviation of, e.g., the distance between adjacent image forming sections or the position or angle of the individual image forming section from ideal one causes colors to be brought out of register on an output image. Let this kind of deviations be referred to as regular deviations. Such misregister lowers the quality of the output image. To solve this problem, it has been customary with this kind of apparatus to determine, before actual image formation, the amount of deviation of a register position color by color, and correct the deviation.

However, the conventional correction is effective only with the regular deviations ascribable to, e.g., the degree of mounting accuracy of the individual unit and the varying ambient temperature. In practice, there also occur variation in dot position and pitch and having a particular period due to variation in the speed of the individual photoconductive drum and the speed of a conveyor belt. Let this kind of deviations be referred to as irregular deviations. As a result, the image quality available with the conventional apparatus not dealing with the irregular deviations is limited.

SUMMARY OF THE INVENTION

It is therefore an object of the present invention to provide a color image forming apparatus capable of producing high quality color images by correcting not only regular deviations of register position but also irregular deviations ascribable to irregular misregister and irregular pitch each occurring at a particular period.

In accordance with the present invention, a color image forming apparatus having a plurality of image forming devices sequentially arranged along a conveyor belt in order to form a color image includes a sensor for reading register marks sequentially formed on the conveyor belt by the image forming devices. A correcting section determines, in response to the output of the sensor, a deviation of a register position of each of the image forming devices, and corrects the register position of the individual image forming device. A separating section separates, based on the output of the sensor, a regular deviation component representative of a regular deviation of the register position and an irregular deviation component fluctuating at a particular period. The correcting section corrects the register position with respect to each of the regular deviation component and the irregular deviation component.

Also, in accordance with the present invention, a color image forming apparatus having a plurality of image forming devices sequentially arranged along a conveyor belt in order to form a color image includes a sensor for reading register marks sequentially formed on the conveyor belt by the image forming devices. A correcting section determines, in response to the output of the sensor, a deviation of a register position of each of the image forming devices, and corrects the register position of the individual image forming means. The correcting section has a first correcting section for correcting, based on the output of the sensor, a regular deviation component representative of a regular deviation of the register position, and a second correcting section for correcting, based on the output of the sensor, an irregular deviation component fluctuating at a particular period.

Further, in accordance with the present invention, a color image forming apparatus for sequentially transferring toner images of different colors to a sheet carried on a conveyor belt one above the other to thereby form a color image on the sheet includes a plurality of image forming devices sequentially arranged along the conveyor belt, each for scanning the respective photoconductive drum with a beam reflected by the respective rotary polygonal mirror. A controller detects a variation in the speed of the photoconductive drum and./or a variation in the speed of the conveyor belt, and controls the rotation speed of the polygonal mirror on the basis of the variation.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
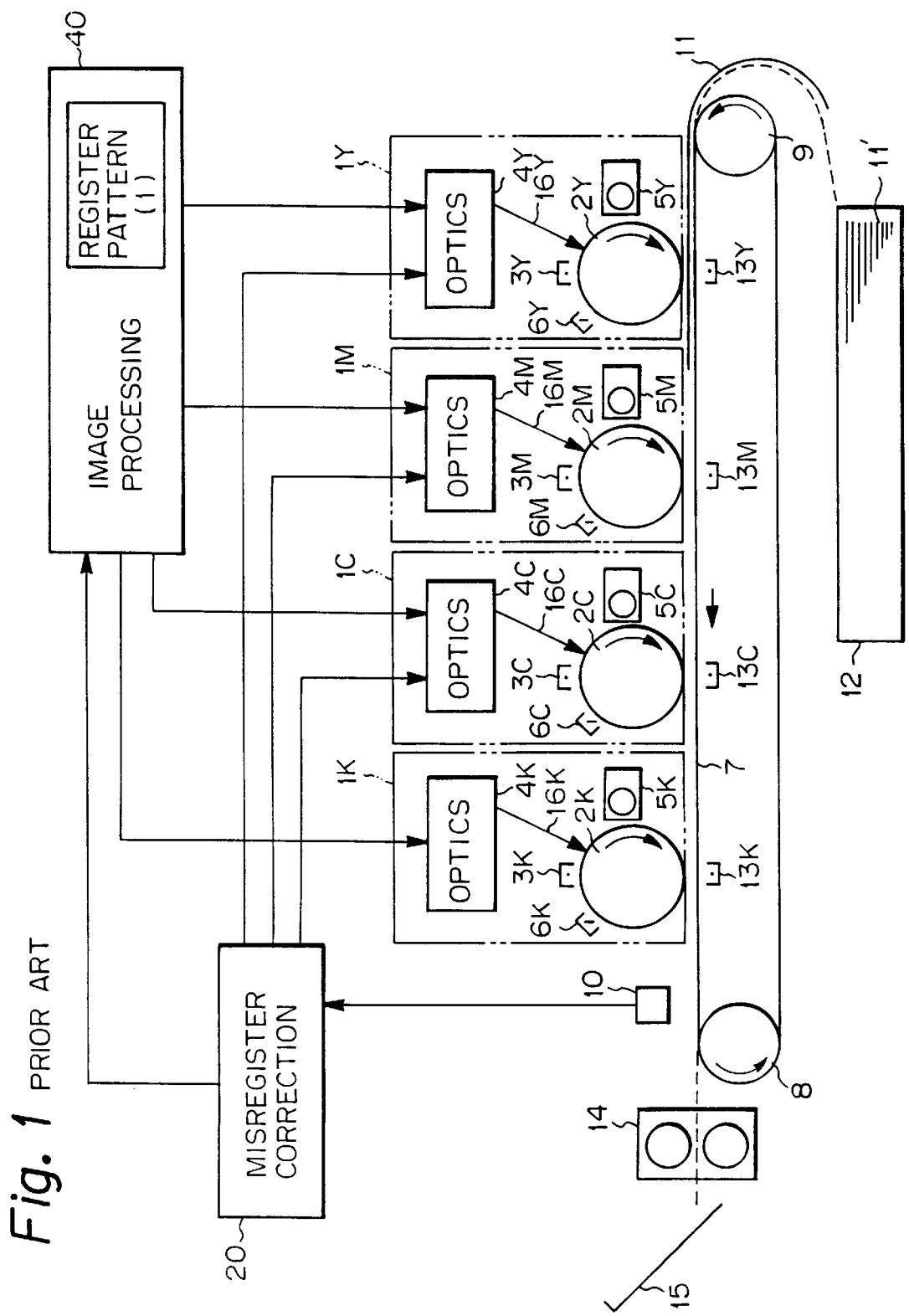
FIG. 1 shows an essential part of a conventional color image forming apparatus.

To better understand the present invention, brief reference will be made to a conventional color image forming apparatus, shown in FIG. 1. As shown, the apparatus includes four image forming sections 1Y, 1M, 1C and 1K sequentially arranged along a conveyor belt 7 in this order. Letters Y, M, C and K stand for yellow, magenta, cyan and black, respectively. The belt 7 is passed over a drive roller 8 and a driven roller 9 and caused to rotate by the rollers 8 and 9 in the direction indicated by an arrow in FIG. 1. A sheet tray 12 is positioned below the belt 7 and loaded with a stack of sheets 11'. In the event of image formation, the uppermost sheet, labeled 11, is fed out from the tray 12 and electrostatically retained on the belt 7. The belt 7 conveys the sheet 11 retained thereon to the first or yellow image forming section 1Y. The image forming section 1Y forms a yellow toner image on the sheet 11.

The image forming section 1Y includes a photoconductive drum 2Y. Arranged around the drum 2Y are a charger 3Y, optics for exposure 4Y, a developing unit 5Y, a cleaning unit 6Y, etc. The charger 3Y charges the surface of the drum 2Y uniformly. The optics 4Y exposes the charged surface of the drum 2Y with a laser beam 16Y corresponding to yellow image data, electrostatically forming a latent image representative of a yellow image. The developing unit 5Y develops the latent image so as to form a yellow toner image on the drum 2Y. An image transfer unit 13Y is located at an image transfer position where the sheet 11 on the belt 7 contacts the drum 2Y. The image transfer unit 13Y transfers the yellow toner image from the drum 2Y to the sheet 11. After the image transfer, the cleaning unit 6Y removes the toner left on the drum 2Y and thereby prepares the drum 2Y for the next image formation.

The belt 7 conveys the sheet 11 carrying the yellow toner image thereon to the second or magenta image forming section 1M. In the image forming section 1M, a magenta toner image is formed on a photoconductive drum 2M and then transferred to the sheet 11 over the yellow toner image. Likewise, the third or cyan image forming section 1C and the fourth or black image forming section 1K respectively form a cyan and a black toner image and transfer them to the sheet 11 over the existing composite toner image. As a result, a color image is completed on the sheet 11. The sheet 11 moved away from the image forming section 1K and carrying the complete color image thereon is separated from the belt 7. Subsequently, a fixing unit 14 fixes the color image on the sheet 11. The sheet 11 coming out of the fixing unit 14 is driven out onto a tray 15.

Figure 2:
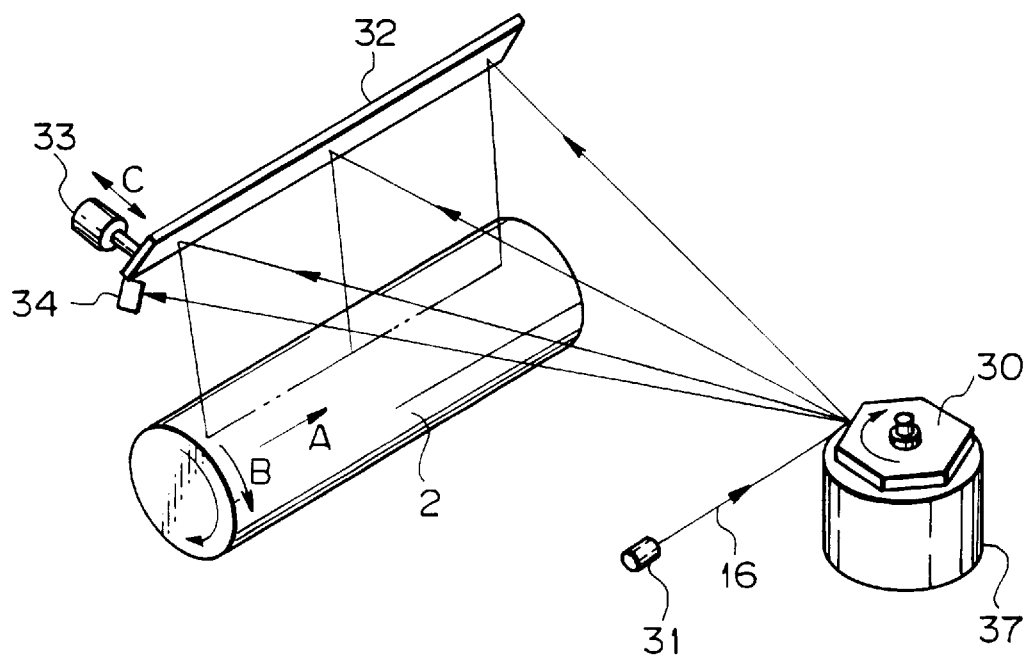
FIG. 2 is a perspective view showing a specific configuration of optics and a photoconductive drum included in the apparatus shown in FIG. 1.

FIG. 2 shows a specific arrangement of the optics 4 (4Y, 4M, 4C or 4K) and the drum 2 (2Y, 2M, 2C or 2K). As shown, a laser or light source 31 receives an image signal from an image processing 40, FIG. 1, at an image form timing assigned thereto. The image signal is representative of one of four image patterns of different colors derived from a single original image. The laser 31 emits a laser beam 16 in synchronism with the image signal. The laser beam 16 is steered by a polygonal mirror 30 and then reflected by a mirror 32. The polygonal mirror 30 is rotated by a motor 37. As a result, the laser beam 16 scans the surface of the drum 2 in the direction parallel to the axis of rotation of the drum 2, i.e., in the main scanning direction (arrow A). In addition, the laser beam 16 scans the drum 2 in the direction perpendicular to the main scanning direction, i.e., in the subscanning direction (arrow B) due to the rotation of the drum 2.

The problem with the above conventional apparatus is that any deviation of the distance between the adjacent image forming sections 1 (1Y, 1M, 1C and 1K) or the location or angle of the individual image forming section 1 from ideal one results in the deviation of color components, i.e., misregister. In light of this, it has been customary to cause, before actual image formation, the image forming sections 1 to sequentially form register marks on the belt 7. The amounts of misregister of the consecutive image forming sections 1 are determined by sensing the register marks. Then, the misregister is corrected.

Figure 3:
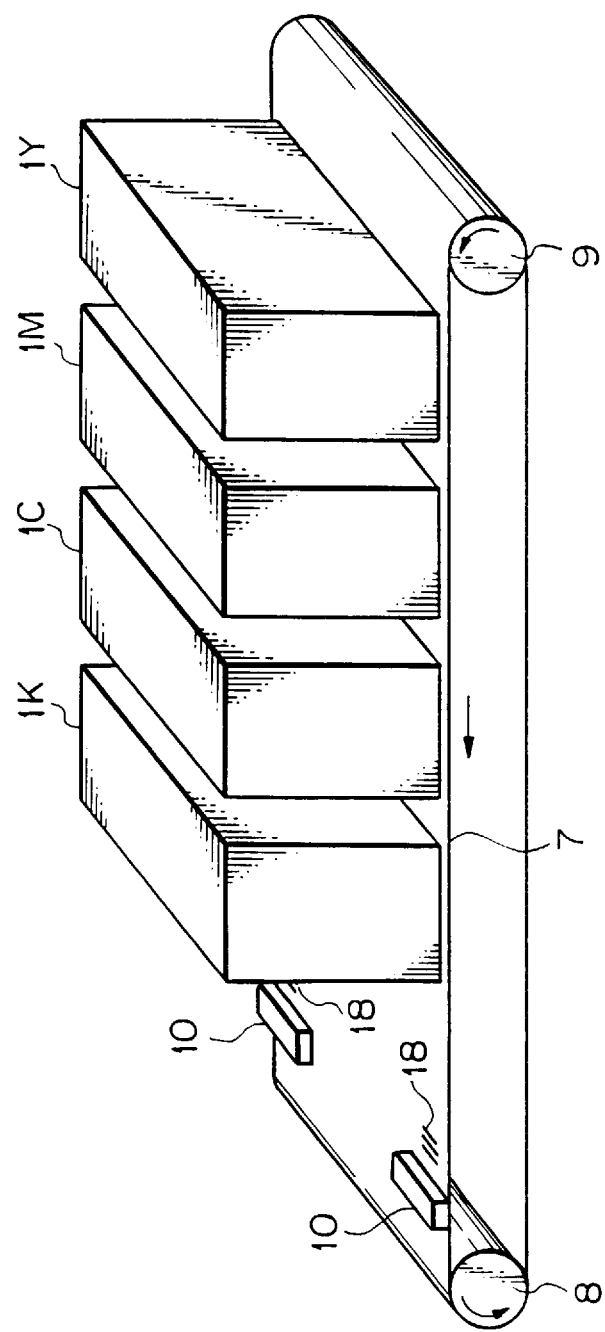
FIG. 3 demonstrates how the apparatus of FIG. 1 corrects a register position.

Specifically, as shown in FIG. 3, the image forming sections 1Y–1K each forms a register mark 18 of particular color on the belt 7. A register mark sensor 10 is located downstream of the last image forming section 1K with respect to the direction of rotation of the belt 7. The sensor 10 senses the register mark 18 of different colors sequentially formed by the image forming sections 1Y–1K. The resulting outputs of the sensor 10 are used to correct misregister.

More specifically, the image processing 40, FIG. 1, includes a memory storing a pattern (1) representative of the register mark 18. A controller, not shown, controls the entire image forming apparatus. Before actual image formation, the controller reads the pattern (1) out of the memory and sequentially sends an image signal representative of the pattern (1) to the consecutive image forming sections 1Y–1K, FIG. 3. In response, the image forming sections 1Y–1K each forms the register mark 18 of particular color on the belt 7. The resulting output of the sensor 10 is sent to a misregister correction 20, FIG. 1. The misregister correction 20 processes the signal input from the sensor 10 in order to determine a positional deviation of the individual color, and then delivers a correction signal based on the deviation to the image processing 40 and associated one of the image forming sections 1Y–1K. In response, the image processing 40 corrects the write start timing of the image signal to be sent to the above image forming section 1. At the same time, the image forming section 1 corrects the scanning angle (inclination) of the laser beam 16 for scanning the drum 2.

Figure 4A:
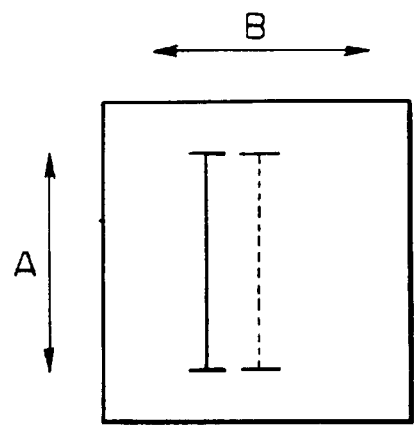
FIGS. 4A–4D show various kinds of misregister to occur in a color image.
Figure 4B:
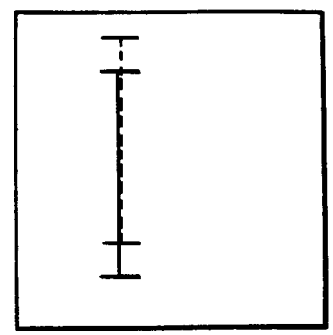
Figure 4C:
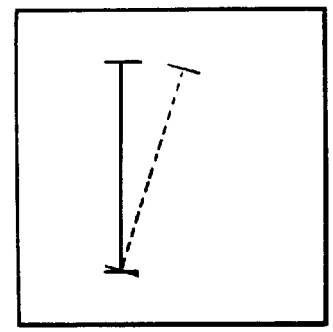
Figure 4D:
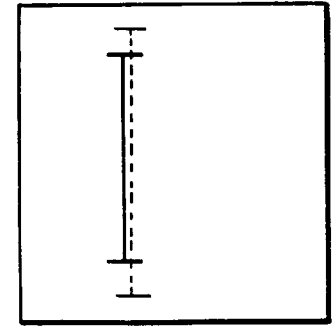

In the apparatus of the type having the image forming sections 1Y–1K arranged side by side, the misregister among different colors is derived from the following factors. In FIGS. 4A–4D, the arrows A and B are respectively indicative of the main scanning direction and subscanning direction while solid lines and phantom lines are respectively indicative of the ideal (regular) positions and deviated (irregular) positions of images. As shown in FIG. 4A, when the write start timing assigned to any one of the image forming sections 1Y–1K is deviated, the actual image is deviated from the ideal image in the direction B, i.e., subscanning direction. As shown in FIG. 4B, when the scan start timing in the main scanning direction is deviated, the actual image is deviated from the ideal image in the direction A, i.e., main scanning direction. On the other hand, assume that the scanning line of the laser beam scanning the drum 2 tilts due to the deviation of the angular position of the optics 4 or the inclination of the axis of the drum 2. Then, as shown in FIG. 4C, the actual image skews with respect the regular main scanning direction A. Further, when an error occurs in, e.g., the length of the optical path between the laser and the drum, a magnification error occurs in the regular writing direction, as shown in FIG. 4D.

Figure 5:
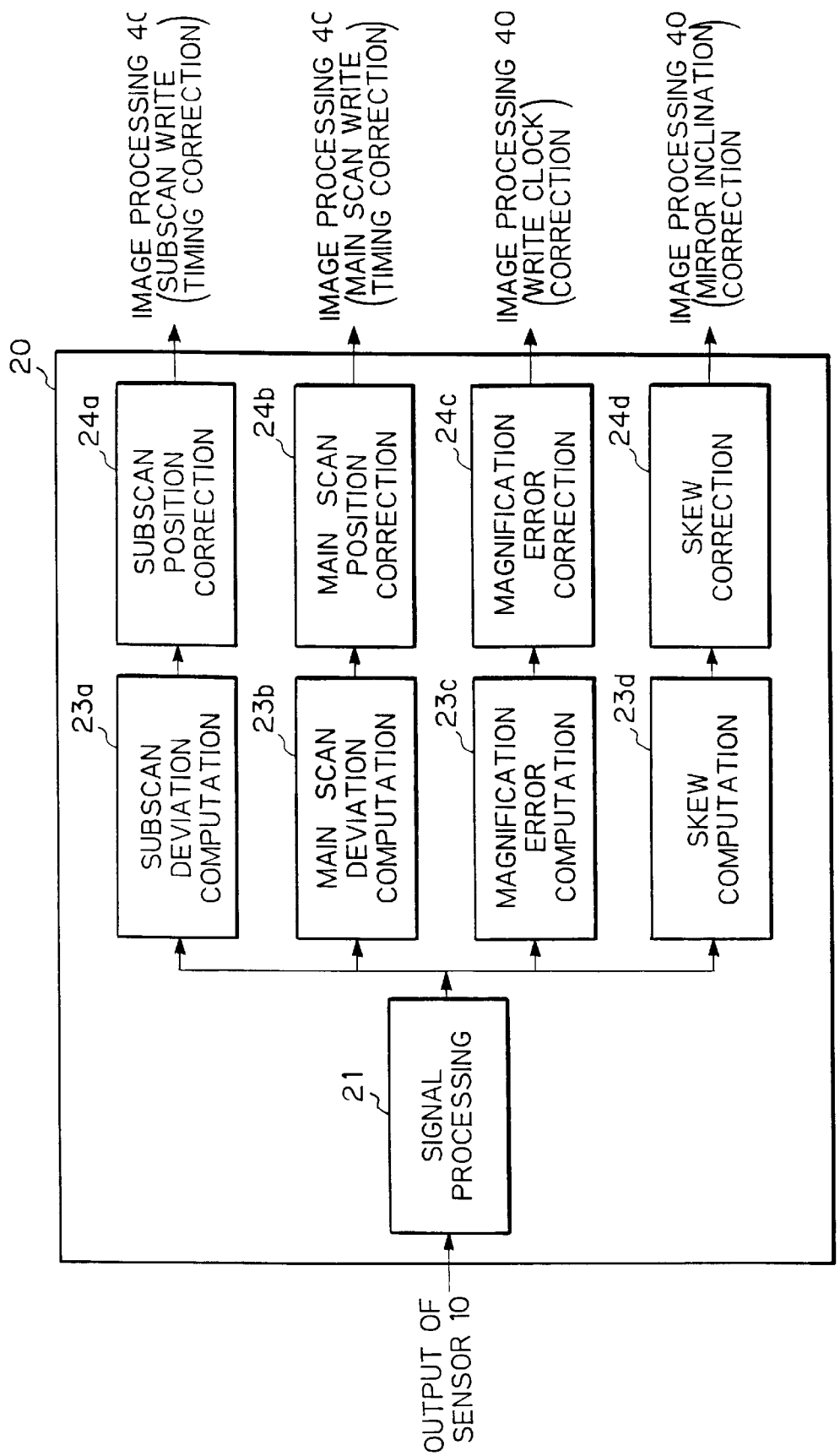
FIG. 5 is a block diagram schematically showing a misregister correcting section included in the apparatus of FIG. 1.

FIG. 5 shows a specific configuration of the misregister correction 20 and demonstrates a specific misregister correction procedure. As shown, the output of the register mark sensor 10 is input to a signal processing 21. Because the output of the sensor 10 contains various kinds of noise the signal processing 21 removes signal components not necessary for the detection of deviation. A subscan deviation computation 23*a* and a main scan deviation computation 23*b* respectively compute, based on the output of the signal processing 21, a deviation in the subscanning direction and a deviation in the main scanning direction. Likewise, a magnification error computation 23*c* and a skew computation 23*d* respectively compute a magnification error and an amount of skew. Then pattern representative of the register marks 18, FIG. 3, may be suitably varied in order to facilitate the computation of the individual deviation component. The deviations output from the computations 23*a*–23*d* are respectively fed to a subscan position correction 24*a*, a main scan position correction 24*b*, a magnification error correction 24*c*, and a skew correction 24*d*.

The subscan position correction 24*a* outputs, based on the deviation input from the computation 23*a*, a correction signal for correcting the deviation in the subscanning direction and sends it to the image processing 40. In response, the image processing 40 corrects the image write timing in the subscanning direction. Likewise, the main scan position correction 24*b* sends a correction signal based on the output of the computation 23*b* to the image processing 40. In response, the image processing 40 corrects the write timing in the main scanning direction. The magnification error correction 24*c* sends a correction signal based on the output of the computation 23*c* to the image processing 40, so that the processing 40 corrects the frequency of a write clock. On the other hand, the skew correction 24*d* sends a correction signal based on the output of the computation 23*d* to the image forming section 1 in question. In response, the optics 4 of the image forming section 1 has the inclination of the mirror 32 corrected so as to correct the inclination of the laser beam. In the arrangement shown in FIG. 2, an actuator 33 is used to move the mirror 32 in a direction C so as to correct the inclination of the mirror 32.

For the above correction, the register mark of particular color, e.g., black is used as a reference, so that the deviations of the other three colors (yellow, magenta and cyan) of register marks are detected in relation to the reference. More specifically, the processing described with reference to FIG. 5 is executed with each of the yellow, magenta and cyan so as to bring them into register with black. With such a correction procedure, it is possible to produce actual color images free from misregister.

However, the conventional correction procedure described above is effective only with the regular positional deviations, as discussed earlier. That is, the procedure cannot deal with irregularities in dot position and pitch having particular periods and ascribable to variation in the rotation speed of the individual drum and that of the running speed of the belt. As a result, the image quality available with such a procedure is limited.

Figure 6:
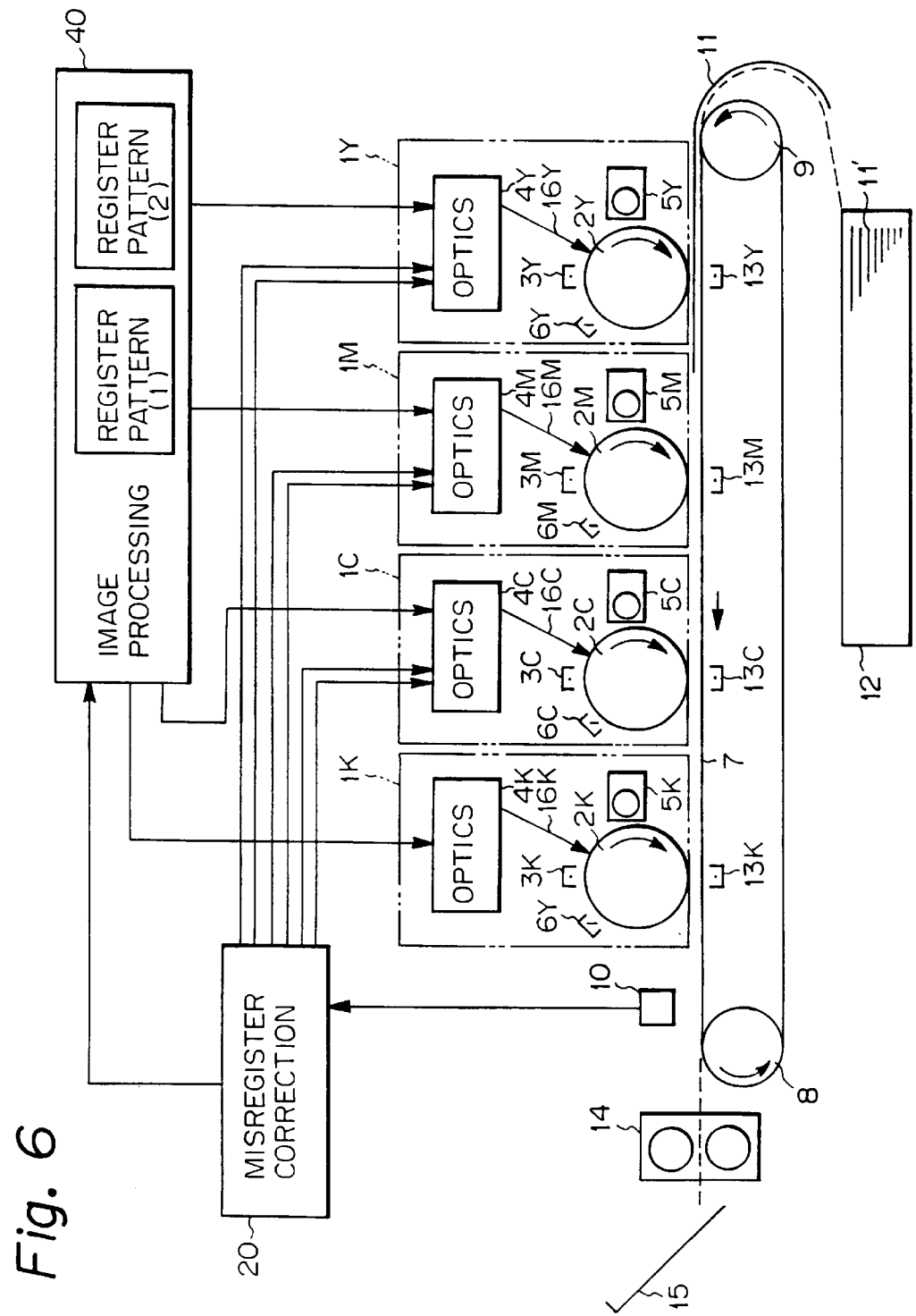
FIG. 6 shows the general construction of a color image forming apparatus embodying the present invention.

Referring to FIG. 6, a color image forming apparatus embodying the present invention will be described. In FIG. 6, the same or similar structural elements as or to the elements shown in FIG. 1 are designated by the same reference numerals, and a detailed description thereof will not be made in order to avoid redundancy. The following description will concentrate on the constructions and operations of a misregister correction 20 and image processing 40 which are different from conventional ones.

As shown in FIG. 6, the image processing 40 includes a memory storing patterns (1) and (2) each being representative of a particular register mark. The pattern (1) is identical with the pattern (1) stored in the memory of the conventional image processing 40, FIG. 1, and assigned to the regular deviations. The other pattern (2) is assigned to the irregular deviations.

In the illustrative embodiment, the register mark represented by the pattern (2) is output before the mark represented by the pattern (1). The pattern (2) is used to correct the irregular positional deviations each having a particular period and ascribable to, e.g., periodic variation in the system for driving the photoconductive drum 2. More specifically, the pattern (2) is used to correct positional deviations or misregister ascribable to the rotation of the drum 2 and those of the rollers 8 and 9 which are greatly effected by periodic factors. Preferably, therefore, the pattern (2) should have a length corresponding to the circumferential length of a rotary body to be driven.

Figure 9:
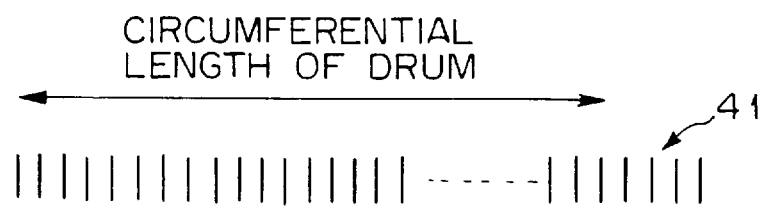
FIG. 9 shows a specific register mark with which the embodiment of FIG. 6 is practicable.

FIG. 9 shows a specific register mark 41 derived from the pattern (2). Ideally, the register mark 41 is a pattern implemented as a set of equally spaced lines in the subscanning direction. If any irregular positional deviation exists, then the pitch between the lines shown in FIG. 9 varies. It is therefore possible to determine the amount of irregular deviation by measuring the variation of the pitch. The precondition is that the irregular deviation be a continuous function having a particular period coincident with, e.g., the period of the drum 2.

Figure 7:
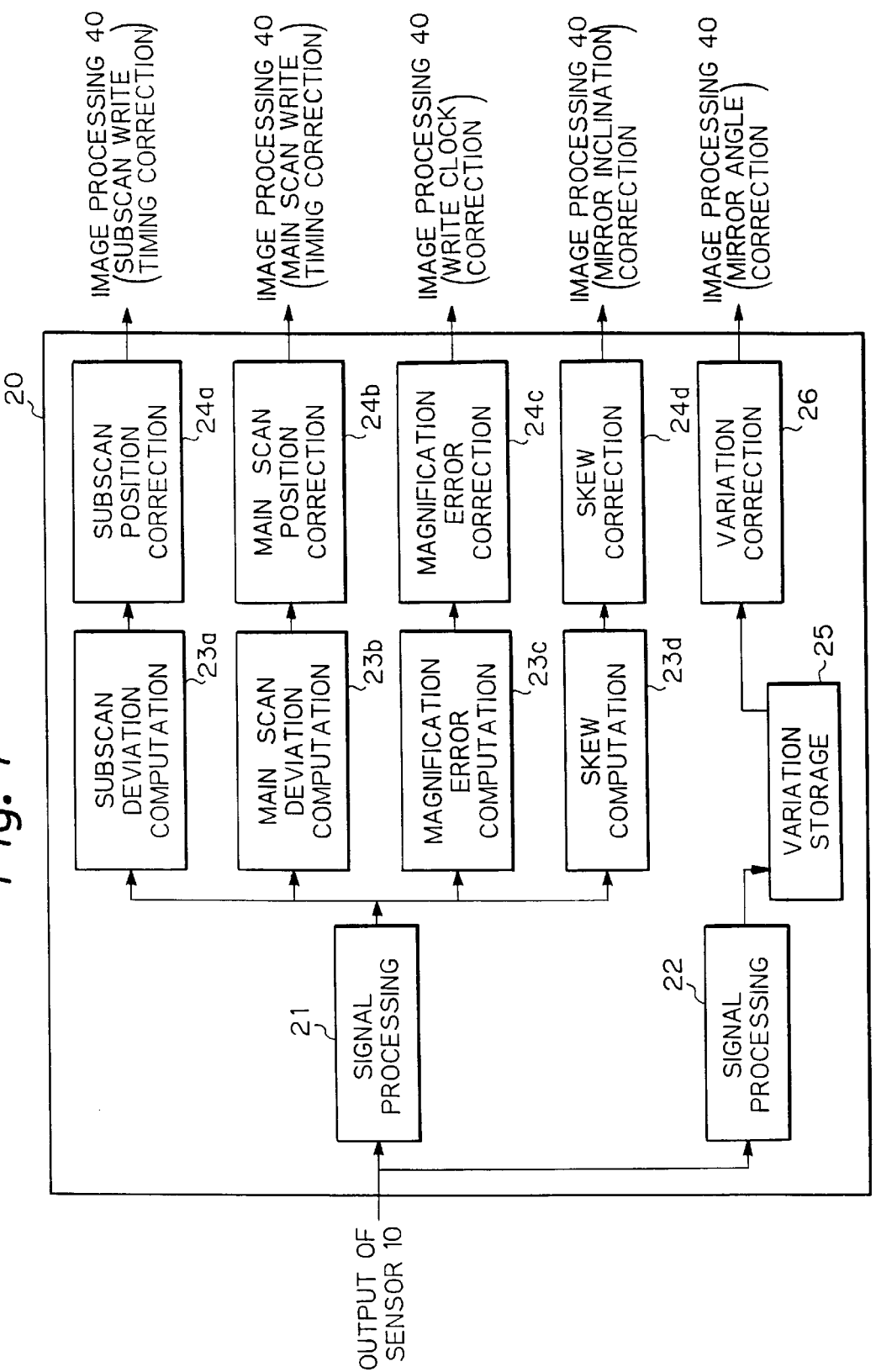
FIG. 7 is a block diagram schematically showing a misregister correcting section included in the embodiment of FIG. 6.

As shown in FIG. 7, in the illustrative embodiment, the misregister correction 20 has a signal processing 22, a variation storage 25, and a variation correction 26 in addition to the signal processing 21, computations 23*a*–23*d* and corrections 24*a*–24*d* of the previous embodiment. The additional processing 22, storage 25 and correction 26 are associated with the pattern (2).

Figure 8:
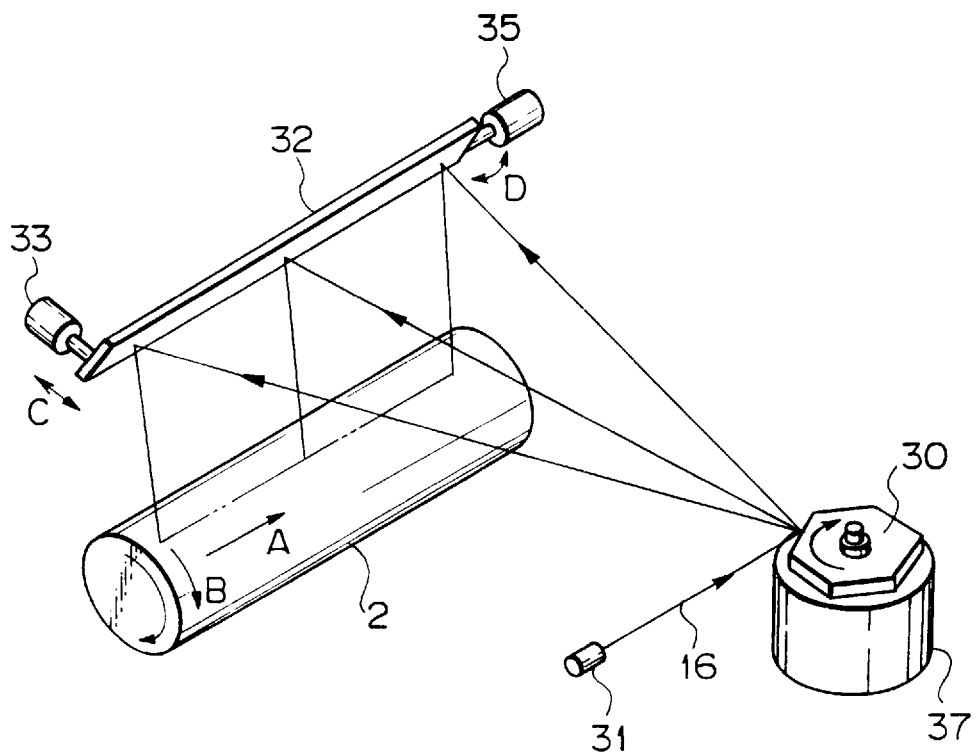
FIG. 8 is a perspective view showing optics and a photoconductive drum also included in the embodiment of FIG. 6.

The output of a register mark sensor 10 representative of the pattern (2) is input to the signal processing 22. In response, the signal processing 22 determines a variation in pitch, i.e., a periodic variation in position. The variation data output from the signal processing 22 is written to the variation storage 25. The data stored in the storage 25 is output from the storage 25 in synchronism with the period of the variation and sent to the misregister correction 26. The correction 26 finely adjusts the angle of the mirror 32, FIG. 8, of the image forming section in synchronism with the periodic variation of the position. Specifically, as shown in FIG. 8, the actuator 35 causes the mirror 32 to rotate delicately in a direction D, thereby varying the position of the laser beam incident to the drum 2 in the subscanning direction. Because such adjustment of the mirror 32 occurs regularly at the time of image formation, there can be corrected the periodic positional deviation of, e.g., the system for driving the drum 2.

As stated above, the embodiment corrects the irregular positional deviation and then outputs the pattern (1), as in the conventional apparatus, in order to correct the regular positional deviation with high accuracy. This successfully insures high quality color images suffering from a minimum of misregister.

Figure 10:
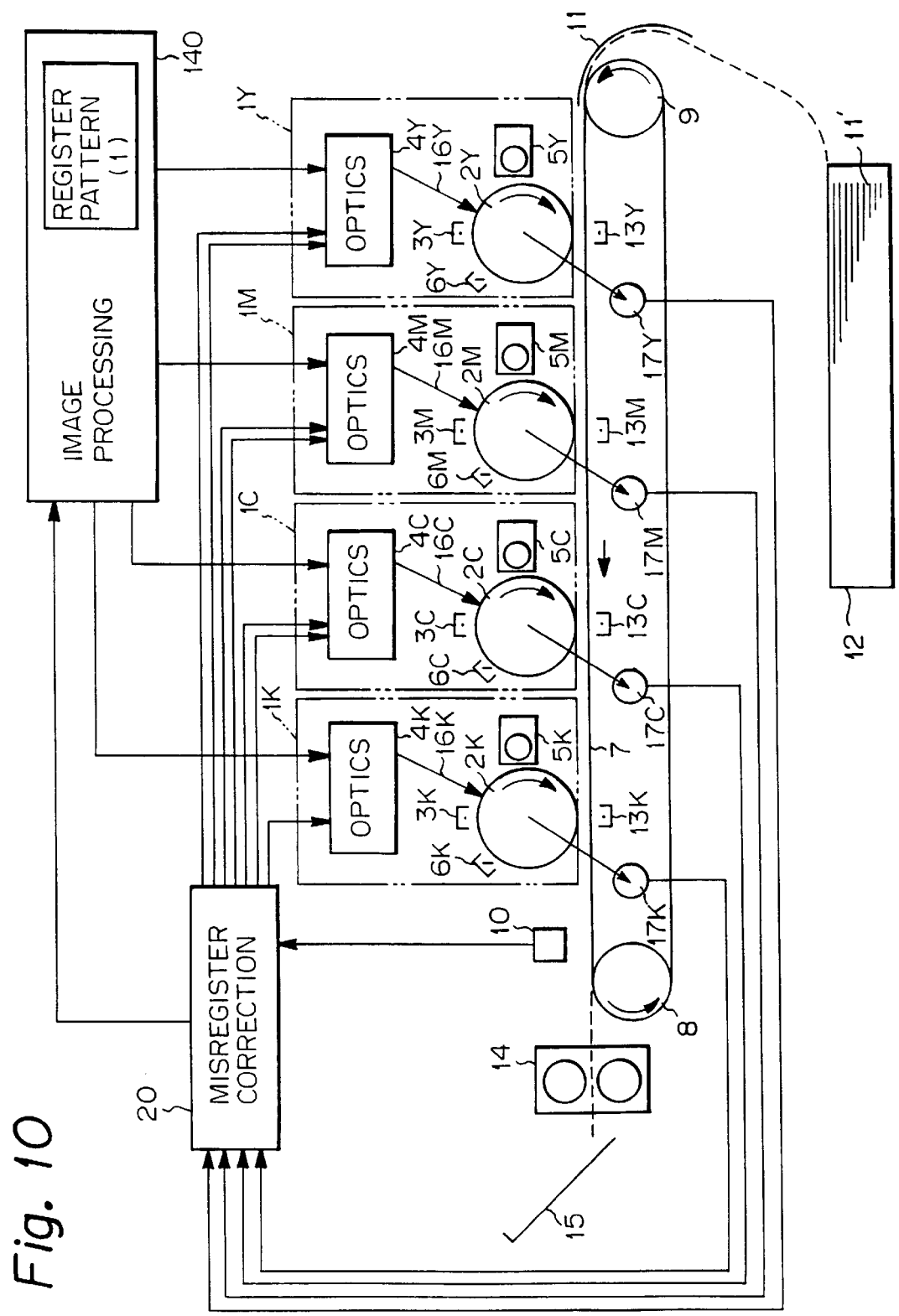
FIG. 10 shows an alternative embodiment of the present invention.

Referring to FIG. 10, an alternative embodiment of the present invention is shown which is essentially similar to the previous embodiment except for the following. How the embodiment corrects misregister before usual image formation will be described hereinafter.

As shown in FIG. 10, encoders or similar velocity sensing devices 17K, 17C, 17M and 17Y are respectively mounted on the shafts of the drums 2K, 2C, 2M and 2Y. The encoders 17K–17Y each senses variation in the rotation speed of the associated drum 2. If the rotation speed of any one of the drums 2 varies, then the position where the associated optics 4 writes an image on the drum 2 and the position of the sheet 11 to which the toner image is transferred from the drum 2 are shifted. This kind of shift directly translates into the shift of dots in the subscanning direction and into irregular pitch. Further, the shift of dots and irregular pitch appear as a function having a particular period substantially coincident with the period of rotation of the drum 2. In FIG. 10, a variation in the rotation of the drum 2 is detected on the basis of the output of the associated encoder 17, and the resulting signal is sent to the misregister correction 20.

Figure 11:
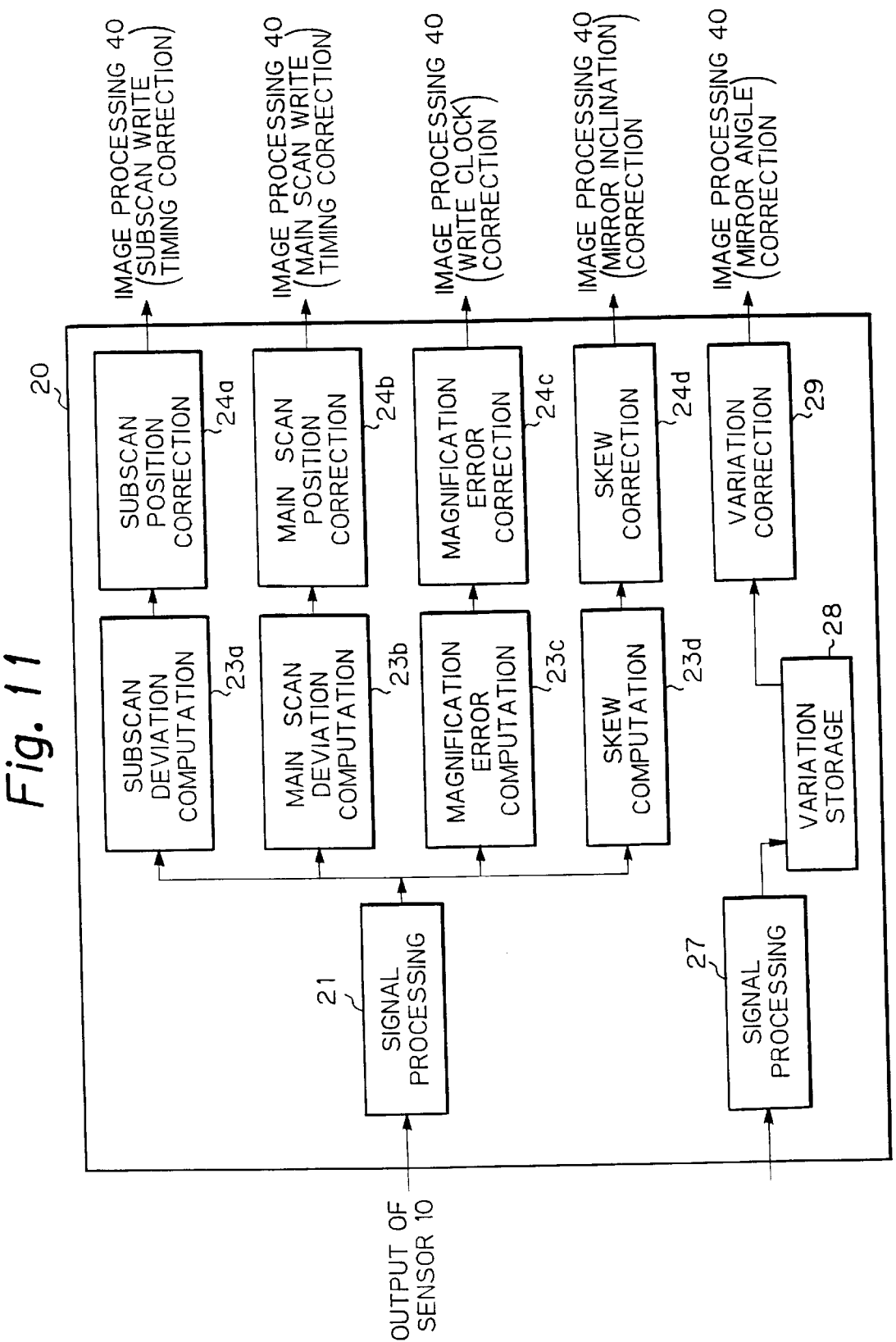
FIG. 11 is a block diagram schematically showing a misregister correcting section included in the embodiment of FIG. 10.

FIG. 11 shows a specific construction of the misregister correction 20 of the above embodiment. As shown, the misregister correction 20 has a signal processing 27, a variation storage 28, and a variation correction 29 in addition to the signal processing 21, computations 23a–23d and corrections 24a–24d. The signal processing 27 removes noise and high-frequency components from the input signal representative of variation of in the rotation of the drum 2, thereby outputting only low-frequency periodic variation components. The variation components are written to the variation storage 28 as speed variation data. The data stored in the storage 28 are output from the storage 28 in synchronism with the rotation position of the drum 2 and sent to the variation correction 29. In response, the correction 29 finely adjusts the angle of the mirror 32, FIG. 8, included in the image forming section 1. With the arrangement of FIG. 8, the correction 29 corrects the periodic irregular deviation of an image on the basis of the data stored in the storage 28. The processing shown in FIG. 11 is sequentially executed with the output signals of the encoders 17K–17Y. Such correction of the irregular deviation of the dot position is effected, based on the data stored in the storage 28, at the time of usual image formation and at the time of regular position correction which will be described.

As stated above, the illustrative embodiment outputs the pattern (1), as in the conventional apparatus, while correcting the irregular deviation of the dot position. Because the regular positional deviation occurs in the absence of irregular deviation, the correction available with the embodiment is more accurate than with the conventional apparatus. This also successfully insures high quality color images suffering from a minimum of misregister.

If desired, an encoder or similar speed sensing device may be mounted on the shaft of each of the rollers 8 and 9 which drive the belt 7, and used to correct irregular variation in dot position. Further, there may be detected variation in the running speed of the surface of the drum 2 or the running speed of the belt 7.

The embodiment shown in FIG. 10 is advantageous over the embodiment shown in FIG. 6 in that it uses direct means for detecting the irregular positional deviation. Generally, the irregular deviation of the dot position of a color image is ascribable mostly to variation in the speed of a photoconductive drum or that of a conveyor belt. Therefore, sensing the source of irregular positional deviation directly, as in the embodiment, is higher in accuracy than sensing a register mark. In addition, this embodiment is capable of determining a definite repetition period. These in combination insure accurate correction of the irregular positional deviation and thereby guarantee high quality color images.

Figure 12:
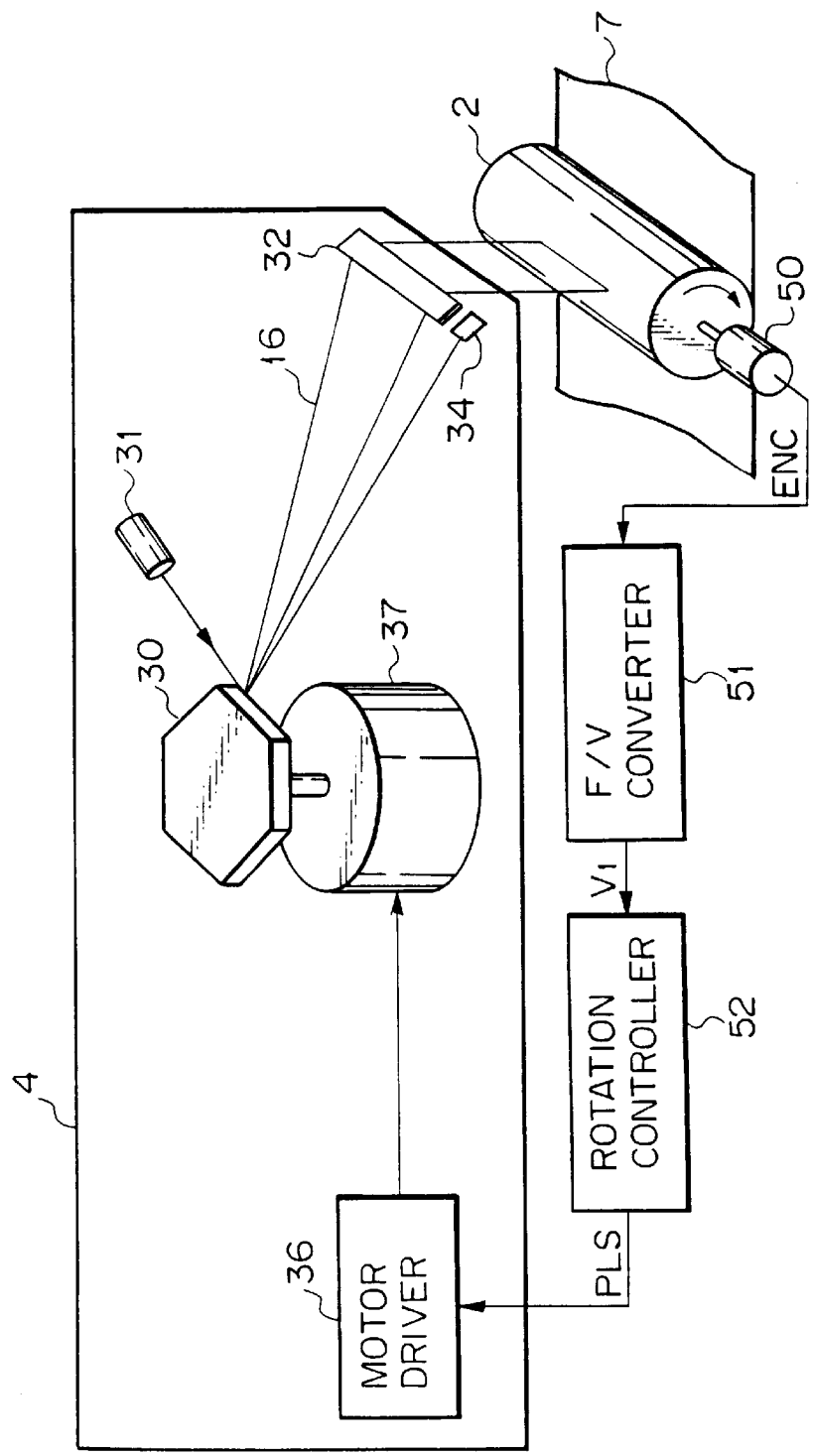
FIG. 12 shows an essential part of another alternative embodiment of the present invention.

FIG. 12 shows a part of any one of the image forming sections 1K–1Y representative of another alternative embodiment of the present invention. This embodiment corrects the exposing position of each of the image forming sections 1K–1Y in relation to the rotation speed of the associated drum 2. As shown, an encoder 50 is mounted on the shaft of the drum 2 (2K, 2C, 2M or 2Y) in order to sense the rotation speed of the drum 2. The encoder 50 outputs a pulse signal (encoder signal ENC) in accordance with the rotation of the drum 2. By determining the frequency of the encoder signal ENC, it is possible to determine the rotation speed of the drum 2. The encoder signal ENC is input to a frequency/velocity (F/V) converter 51. The F/V converter 51 converts the encoder signal ENC to a velocity signal V1 and feeds the signal V1 to a rotation controller 52. The rotation controller 52 generates a pulse signal PS corresponding to the input velocity signal V1 and delivers it to a motor driver 36. The motor driver 36 rotates the motor 37 in synchronism with the pulse signal PLS. The motor 37, in turn, drives the polygonal mirror 30 at a rotation speed based on the variation in the rotation speed of the drum 2.

Figure 13A:
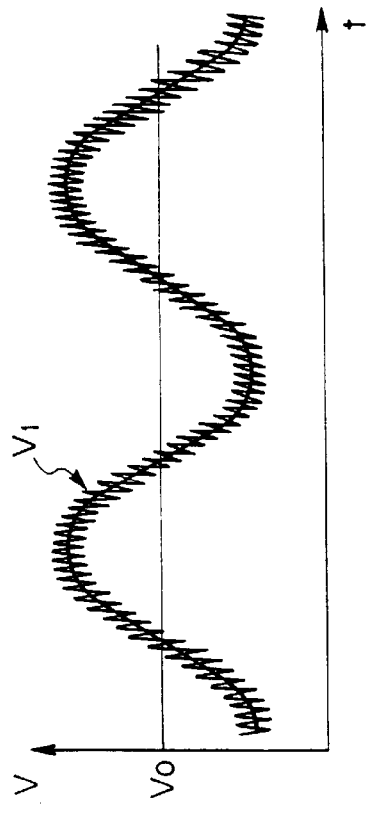
FIGS. 13A and 13B show specific waveforms representative of voltage output from a frequency/velocity converter included in the embodiment of FIG. 12.
Figure 13B:
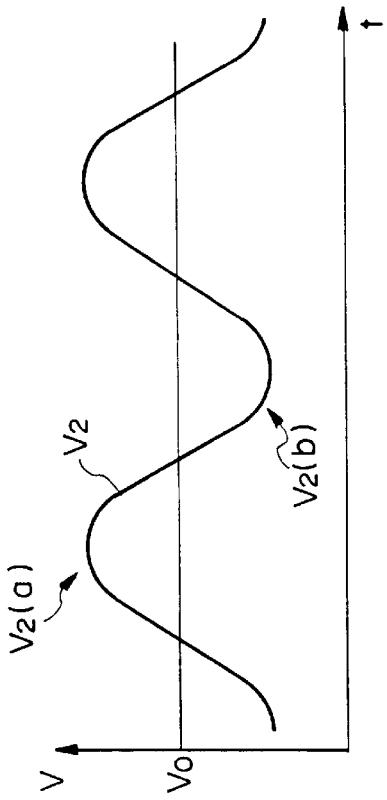

As shown in FIG. 13A specifically, the velocity signal V1 input to the rotation controller 52 contains a low-frequency component and a high-frequency component. The low-frequency component is representative of comparatively great variation in speed, e.g., speed of a motor driving the drum and variation in speed ascribable to the eccentricity of the drum. The high-frequency component is representative of comparatively small variation in speed, e.g., one ascribable to the irregular pitch of a gear driving the drum. Further, the high-frequency component includes noise particular to the output of the velocity sensing device. The velocity signal V1 is applied to, e.g., a low pass filter (LPF) 52a shown in FIG. 14 in order to pass only the low-frequency component. As a result, the low pass filter 52a outputs a velocity signal V2 shown in FIG. 13B. It is to be noted that FIGS. 13A and 13B each shows variation in speed on the ordinate in an enlarged scale for the sake of illustration.

Figure 14:
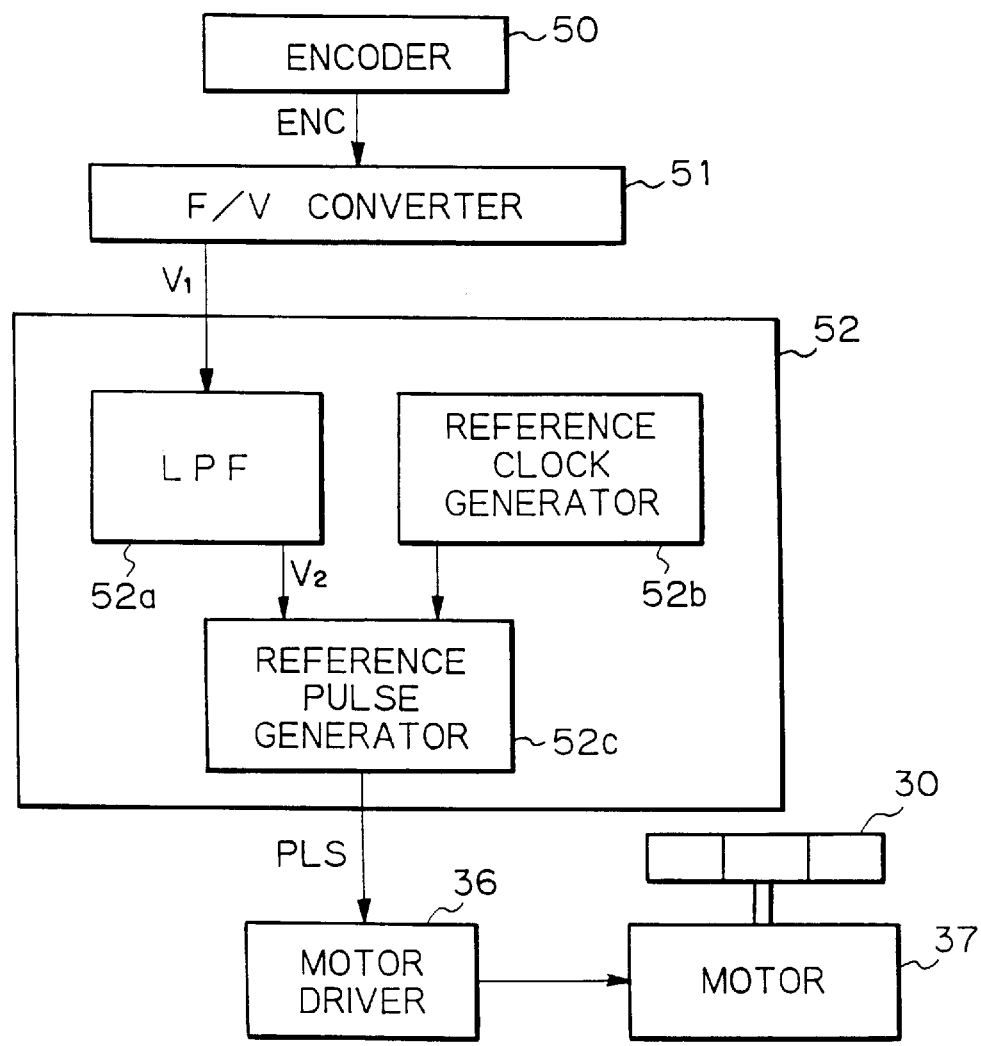
FIG. 14 is a block diagram schematically showing a rotation controller also included in the embodiment of FIG. 12.
Figure 15A:
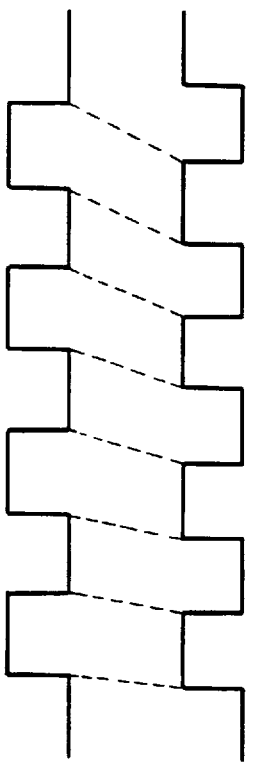
FIGS. 15A and 15B show waveforms representative of a signal output from a reference pulse generator also included in the embodiment of FIG. 12.
Figure 15B:
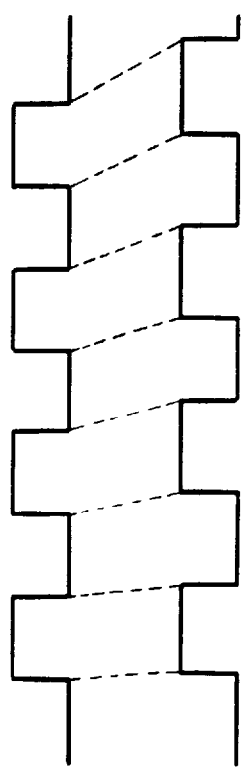

As shown in FIG. 14, the velocity signal V2 output from the LPF 52a is applied to a reference pulse generator 52c. Assume that the velocity represented by the velocity signal V2 is higher than the mean velocity V0 of the drum, as indicated by V2(a) in FIG. 13B. Then, as shown in FIG. 15A specifically, the reference pulse generator 52c sets up a pulse period PLS(a) shorter than a mean pulse period PLS assigned to the mean velocity V0. To reduce the period of the reference pulses to be input to the motor driver 36 means to increase the rotation speed of the motor 37, and therefore to quicken the write timing. Conversely, assume that the velocity represented by the velocity signal V2 is lower than the mean velocity V0 of the drum 2, as indicated by V2(b) in FIG. 13B. Then, as shown in FIG. 15B, the pulse generator 52c increases the period of the pulses PLS(b) and thereby reduces the rotation speed of the motor 37.

The reference pulse generator 52c outputs the reference pulses PLS by dividing the frequency of a high-speed reference clock signal output from a reference clock generator 52b. The pulse generator 52c is implemented as a digital circuit capable of varying the frequency of the above clock signal by a ratio variable with the velocity signal V2. While the above description has concentrated on the high speed V2(a) and low speed V2(b), the embodiment sequentially controls the rotation speed of the motor 37 in accordance with the varying speed to thereby correct the write position in the subscanning direction.

Figure 16:
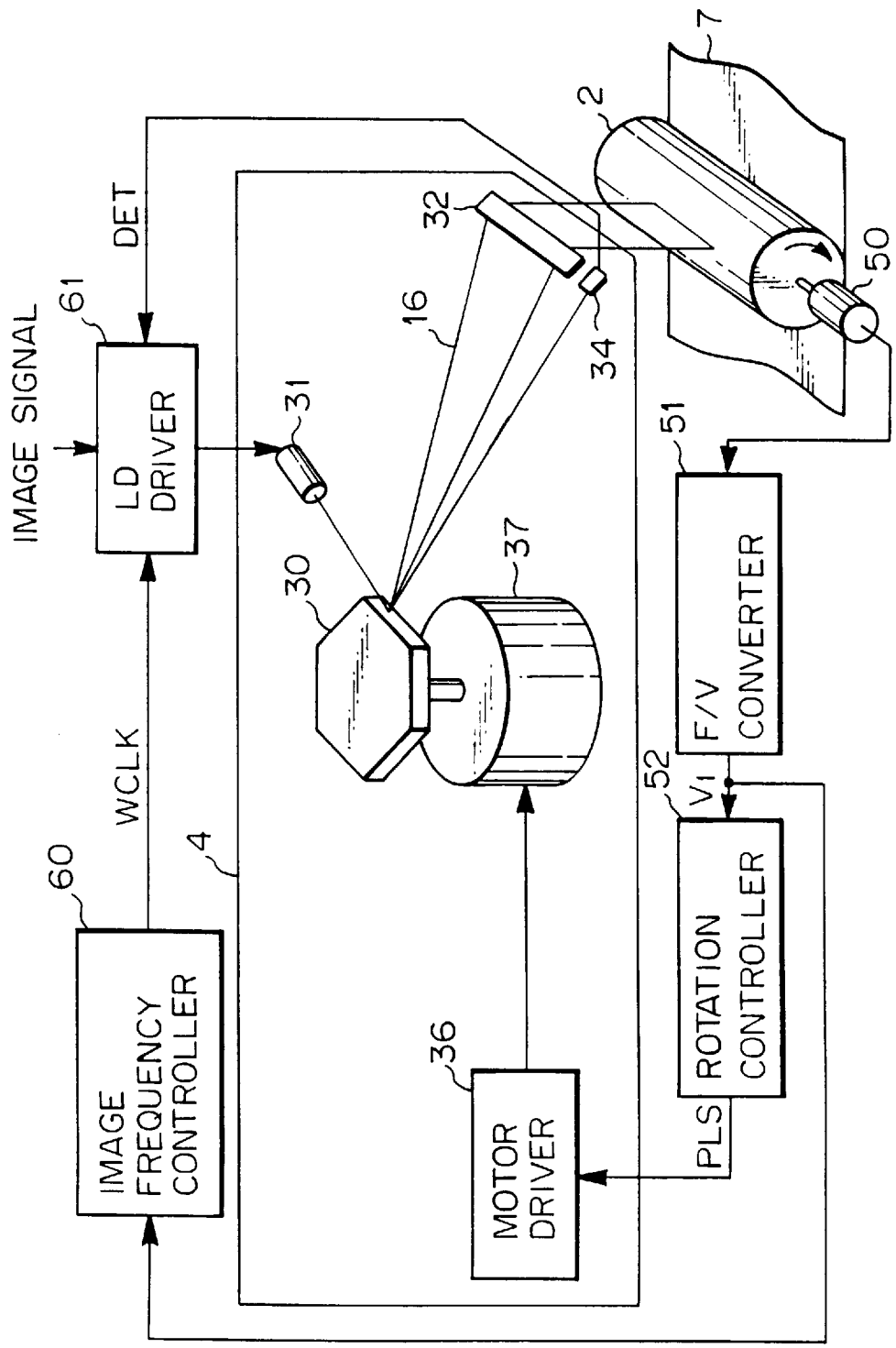
FIG. 16 demonstrates the operation of a laser diode driver also included in the embodiment of FIG. 12.

When the rotation speed of the motor 37 is controlled in accordance with the varying speed of the drum 2, as stated above, the scanning speed in the main scanning direction also varies in accordance with the speed of the motor 37. In light of this, the reference frequency for determining the write timing of the laser beam may be controlled in accordance with the rotation speed of the drum 2, as shown in FIG. 16 specifically. As shown, the velocity signal V1 representative of the variation of speed of the drum 2 is input to an image frequency controller 60. The image frequency controller 60 varies, based on the velocity signal V1, the frequency for writing data in the main scanning direction, i.e., image frequency and thereby outputs a clock signal WCLK. The clock signal WCLK is applied to an LD (Laser Diode) driver 61. Also applied to the LD driver 61 is a synchronization detection signal DET output from a synchronization sensor 34. The LD driver 61 determines the write timing in the main scanning direction on the basis of the detection signal DET, and determines a dot-by-dot write timing in the main scanning direction on the basis of the clock signal WCLK. The LD driver 61 feeds, based on the above timings, the image signal output from the image processing 40 to an LD 31 as a drive signal. As a result, the LD 31 scans the drum 2 with the laser beam 16 in accordance with the drive signal.

Figure 17:
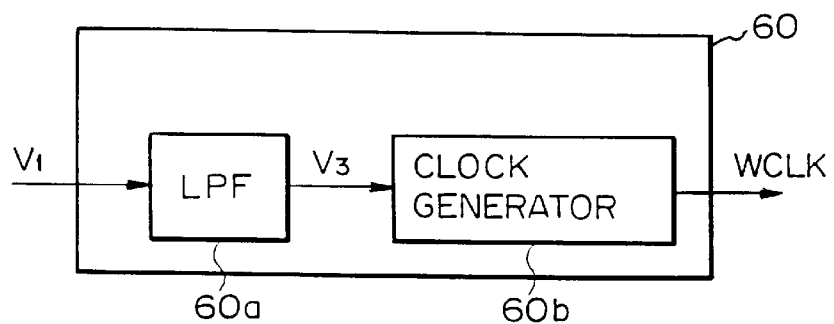
FIG. 17 is a block diagram schematically showing an image frequency controller also included in the embodiment of FIG. 12.
Figure 18A:
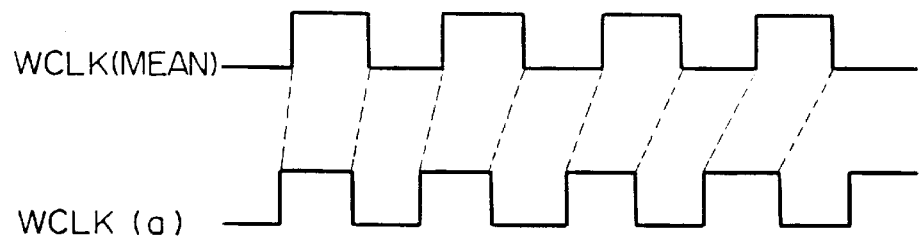
FIGS. 18A and 18B show waveforms representative of a signal output from a clock generator included in the image frequency controller of FIG. 17.
Figure 18B:
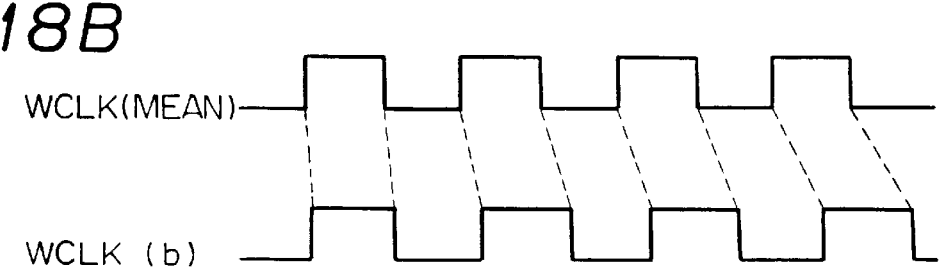

FIG. 17 shows a specific configuration of the image frequency controller 60. As shown, the velocity signal V1 is input to an LPF 60*a* with the result that a velocity signal V3, i.e., low-frequency component contained in the signal V1 is separated. The velocity signal V3 is applied to a clock generator 60*b*. In response, the clock generator 60*b* outputs the clock signal WCLK determining the image frequency, as stated earlier. Because the rotation speed of the motor 37 is increased when the velocity represented by the velocity signal V3 is higher than the mean velocity V0, the clock generator 60*b* increases the write frequency, i.e., reduces the period of the clock signal WCLK, as shown in FIG. 18A. Conversely, because the rotation speed of the motor 37 is reduced when the velocity of the velocity signal V3 is lower than the mean velocity V0, the clock generator 60*b* reduces the write frequency, i.e., increases the period of the clock signal WCLK, as shown in FIG. 18B. The clock generator 60*b* is implemented by, e.g., a frequency synthesizer or a VCO (Voltage Controlled Oscillator) capable of controlling a high-speed clock signal.

While the embodiment has been shown and described as controlling the rotation speed of the motor 37 and image frequency on the basis of variation in the rotation speed of the drum 2, it may control them on the basis of variation in the running speed of the conveyor belt. To sense the running speed of the belt, an encoder may be mounted on the shaft of any one of the rollers over which the belt is passed, as stated previously. Further, the moving speed of the surface of the belt 7 may be directly sensed. This alternative scheme will be effective when the variation of speed of the belt and therefore the positional deviation and irregularity in pitch are noticeable. Moreover, variation in the speed of the drum and variation in the speed of the belt may be detected at the same time for implementing much more effective correction.

As stated above, the illustrative embodiment also insures high quality color images suffering from a minimum of misregister when combined with the conventional regular correction.

Various modifications will become possible for those skilled in the art after receiving the teachings of the present disclosure without departing from the scope thereof.

What is claimed is:

1. A color image forming apparatus having a plurality of image forming means sequentially arranged along a conveyor belt in order to form a color image, said apparatus comprising:

a sensor for reading register marks sequentially formed on said conveyor belt by said plurality of image forming means;

correcting means for determining, in response to an output of said sensor, a deviation of a register position of each of said plurality of image forming means, and correcting the register position of the individual image forming means; and separating means for separating, based on the output of said sensor, a regular deviation component representative of a regular deviation of the register position and an irregular deviation component fluctuating at a particular period;

wherein said correcting means corrects the register position with respect to each of the regular deviation component and the irregular deviation component.

2. An apparatus as claimed in claim 1, wherein said correcting means corrects the register position with respect to the irregular deviation component, then detects the regular deviation component, and then corrects the register position with respect to the regular deviation component.

3. An apparatus as claimed in claim 1, wherein said plurality of image forming means each outputs a register mark for detecting the regular deviation component and a register mark for detecting the irregular deviation component.

4. An apparatus as claimed in claim 3, wherein said correcting means corrects the register position with respect to the irregular deviation component, then detects the regular deviation component, and then corrects the register position with respect to the regular deviation component.

5. A color image forming apparatus having a plurality of image forming means sequentially arranged along a conveyor belt in order to form a color image, said apparatus comprising:

a sensor for reading register marks sequentially formed on said conveyor belt by said plurality of image forming means; and correcting means for determining, in response to an output of said sensor, a deviation of a register position of each of said plurality of image forming means, and correcting the register position of the individual image forming means;

said correcting means comprising:
first correcting means for correcting, based on the output of said sensor, a regular deviation component representative of a regular deviation of the register position; and
second correcting means for correcting, based on the output of said sensor, an irregular deviation component fluctuating at a particular period.

6. An apparatus as claimed in claim 5, wherein said second correcting means detects the irregular deviation component on the basis of a variation in a speed of a photoconductive element included in each of said plurality of image forming means and/or a variation in a speed of said conveyor belt being sensed.

7. An apparatus as claimed in claim 5, wherein said second correcting means corrects the irregular deviation component, and then said first correcting means corrects the regular deviation component.

8. An apparatus as claimed in claim 7, wherein said second correcting means detects the irregular deviation component on the basis of a variation in a speed of a photoconductive element included in each of said plurality of image forming means and/or a variation in a speed of said conveyor belt being sensed.

9. A color image forming apparatus for sequentially transferring toner images of different colors to a sheet carried on a conveyor belt to form a color image on the sheet, said apparatus comprising:

a plurality of image forming devices sequentially arranged along said conveyor belt, each for scanning a respective photoconductive drum with a beam reflected by a respective rotary polygonal mirror; and control means for, detecting a variation in at least one of a speed of said photoconductive drum and a speed of said conveyor belt, controlling a reference frequency for determining a write timing of the beam in a main scanning direction based directly on said variation, and controlling a rotation speed of said polygonal mirror based on said variation.

10. The apparatus as claimed in claim 9, wherein said control means controls the rotation speed based on a low-frequency component contained in said variations.

* * * * *

UNITED STATES PATENT AND TRADEMARK OFFICE
CERTIFICATE OF CORRECTION

PATENT NO. : 5,872,586
DATED : February 16, 1999
INVENTOR(S) : Yutaka SHIO

It is certified that error appears in the above-identified patent and that said Letters Patent is hereby corrected as shown below:

On the title page, item [54], and at the top of Column 1, the Title should read:

--APPARATUS FOR REGISTRATION OF PLURAL IMAGES IN AN IMAGE FORMING APPARATUS--

Signed and Sealed this

Twentieth Day of July, 1999

Attest:

Q. TODD DICKINSON

*Attesting Officer*         *Acting Commissioner of Patents and Trademarks*